(12) United States Patent
Liu et al.

(10) Patent No.: US 10,357,140 B2
(45) Date of Patent: Jul. 23, 2019

(54) AUTONOMOUS WALL CLEANER

(71) Applicant: Xiamen Huaway IOT Technology Co., Ltd., Xiamen (CN)

(72) Inventors: Changzhen Liu, Xiamen (CN); Sixin Chen, Xiamen (CN)

( * ) Notice: Subject to any disclaimer, the term of this patent is extended or adjusted under 35 U.S.C. 154(b) by 370 days.

(21) Appl. No.: 15/379,664

(22) Filed: Dec. 15, 2016

(65) Prior Publication Data

US 2018/0168415 A1 Jun. 21, 2018

(51) Int. Cl.
| | |
|---|---|
| A47L 11/38 | (2006.01) |
| A47L 11/40 | (2006.01) |
| A47L 1/02 | (2006.01) |
| B62D 57/024 | (2006.01) |
| E04G 23/00 | (2006.01) |

(52) U.S. Cl.
CPC .......... *A47L 11/38* (2013.01); *A47L 1/02* (2013.01); *A47L 11/4061* (2013.01); *A47L 11/4066* (2013.01); *A47L 11/4072* (2013.01); *B62D 57/024* (2013.01); *E04G 23/002* (2013.01); *A47L 2201/04* (2013.01)

(58) Field of Classification Search
CPC ........ A47L 11/38; A47L 1/02; A47L 11/4061; A47L 11/4066; A47L 11/4072; B62D 57/024; E04G 23/002
See application file for complete search history.

(56) References Cited

U.S. PATENT DOCUMENTS

| | | | | |
|---|---|---|---|---|
| 4,112,535 A | * | 9/1978 | Wild | E04G 23/002 134/172 |
| 5,890,250 A | * | 4/1999 | Lange | A47L 1/02 15/103 |
| 7,066,434 B2 | * | 6/2006 | Kwok | F16B 47/006 248/205.5 |
| 7,648,109 B2 | * | 1/2010 | Chen | F16B 47/00 248/205.5 |
| 9,168,786 B2 | * | 10/2015 | Schlee | B60B 39/00 |
| 2002/0036108 A1 | * | 3/2002 | Jeswine | B62D 49/0621 180/164 |
| 2003/0048081 A1 | * | 3/2003 | Seemann | B62D 55/00 318/68 |

FOREIGN PATENT DOCUMENTS

EP 3031538 A1 * 6/2016 ............... A47L 1/02

* cited by examiner

*Primary Examiner* — Shay Karls
(74) *Attorney, Agent, or Firm* — The Law Office of Austin Bonderer, PC; Austin Bonderer

(57) ABSTRACT

An autonomous wall cleaner is disclosed. The autonomous wall cleaner comprises a vacuum generator, a number of suction cups, a number of wheels, a number of first actuators, a cleaning element and a controller located on a frame. The wheels are symmetrically arranged on both sides of the frame. The first actuator is capable of driving the wheels. Each suction cup is connected with the vacuum generators and has a sliding disk and an elastic bowl. When the wheels are moving on the wall, the suction cups are sucking to the wall and sliding.

19 Claims, 9 Drawing Sheets

AUTONOMOUS WALL CLEANER

BACKGROUND

1. Technical Field

The present invention relates to an autonomous wall cleaner.

2. Discussion of Related Art

Nowadays, autonomous wall cleaners of walls generally comprise a plurality of silicone suckers as walking mechanism. By adhering to the wall and detaching from the wall by the plurality of silicone suckers repeatedly, the autonomous wall cleaners achieve walking on the wall. However, this kind of autonomous wall cleaners needs more than four groups of walking mechanisms and requires a complex structure. Furthermore, when the wall has an uneven surface or comprises gaps therein, the plurality of silicone suckers should detach from the wall and re-adjust foothold, which needs complex control mode.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "a" embodiment in this disclosure are not necessarily to the same embodiment, and such references mean "at least one."

Figure 1:
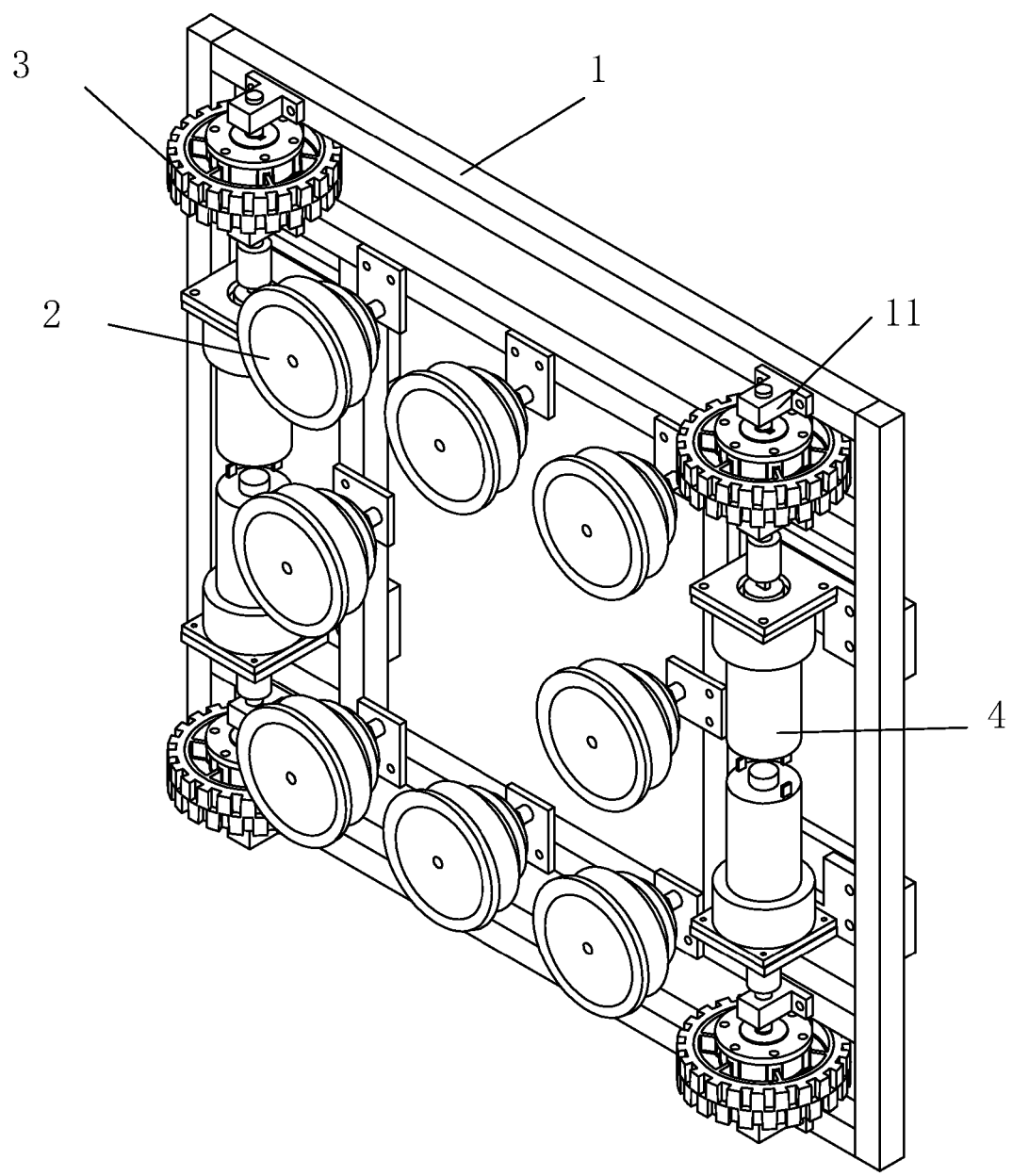
FIG. 1 is a schematic view of one embodiment of an autonomous wall cleaner.
Figure 2:
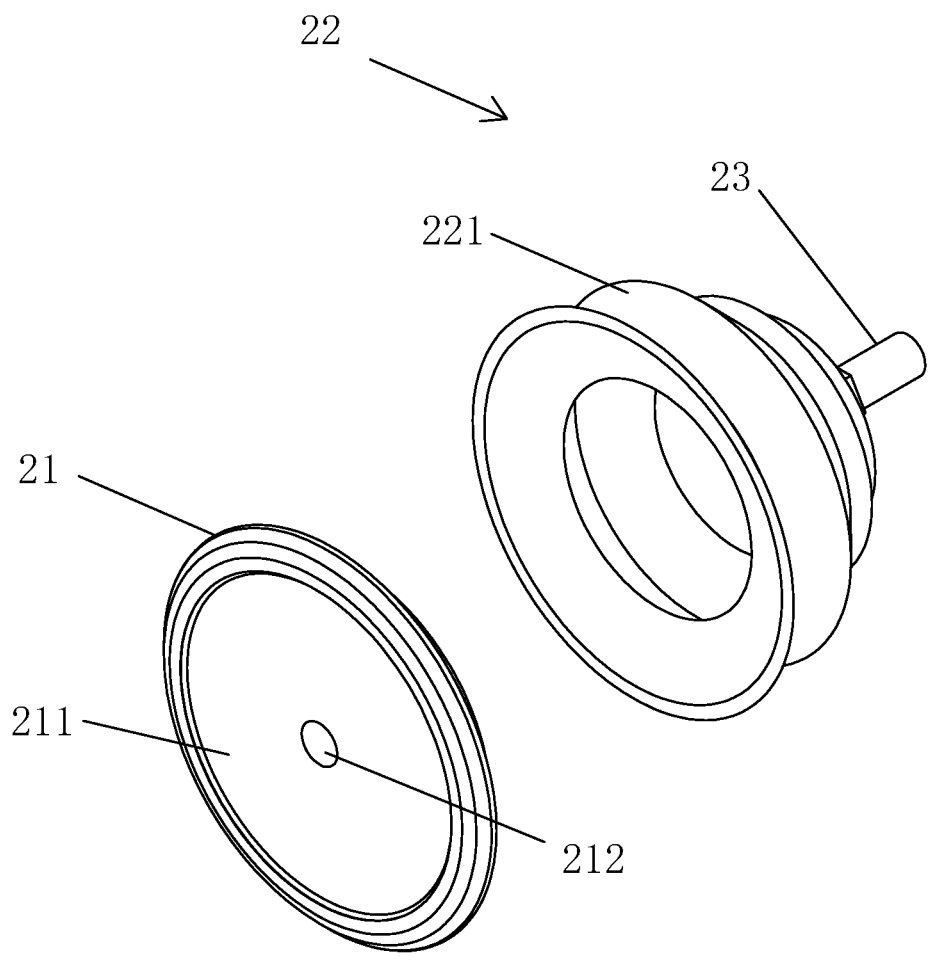
FIG. 2 is a schematic view of one embodiment of suction cups of the autonomous wall cleaner of FIG. 1.
Figure 3:
FIG. 3 is a schematic view of one embodiment of a sliding disk of the autonomous wall cleaner of FIG. 1.

Referring to FIG. 1-3, a autonomous wall cleaner of one embodiment is provided. The autonomous wall cleaner comprises a vacuum generator (not shown in the FIG.), a plurality of suction cups 2, a plurality of wheels 3, a plurality of first actuators 4, a cleaning element 6 and a controller (not shown in the FIG.) located on a frame 1.

The plurality of wheels 3 can be symmetrically arranged on both sides of the frame 1 and can be driven by the plurality of first actuators 4. Each of the plurality of suction cups 2 is coupled to the vacuum generators and comprises a sliding disk 21 and an elastic bowl 22 sealed by the sliding disk 21. The elastic bowl 22 is fixed on the frame 1. The sliding disks 21 are such that when the plurality of wheels 3 are moving on the wall and the sliding disks 21 are still in contact with the wall, the plurality of suction cups 2 still create a vacuum.

A shape of the frame 1 and a number of the plurality of wheels 3 can be adjusted according to different needs. In one embodiment, the shape of the frame 1 is a rectangle, and the autonomous wall cleaner comprises four wheels 3 symmetrically arranged on both sides of the rectangle frame 1. The frame 1 further comprises a plurality of mounting holes 11 capable of mounting the plurality of wheels 3. Each of the plurality of wheels 3 connects to each of the plurality of first actuators 4. The plurality of first actuators 4 can be electric motors for driving the plurality of wheels 3. The friction between the plurality of wheels 3 and the walls can be established to drive the autonomous wall cleaner on the walls.

The elastic bowl 22 comprises a mounting section 23 away from the sliding disk 21. The elastic bowl 22 can be mounted on the frame 1 by a bolt through the mounting section 23. A material of the sliding disk 21 can be a wear-resistant hard material having a smooth surface. such as the sliding disk 21 can slide along the wall. The sliding disk 21 can comprise of PTFE, POM, metal, and/or ceramic. In one embodiment, the material of the sliding disk 21 is PTFE.

The sliding disk 21 comprises a smooth surface adjacent to the wall. The smooth surface comprises a groove 211 matched with the sliding disk 21. In one embodiment, the sliding disk 21 and the groove 211 are round. An adsorption ability of the plurality of suction cups 2 depends on the area of the groove 211. The greater the area of the groove 211, the stronger the adhesion ability of the plurality of suction cups 2 after vacuum pumping. Defining diameters of the plurality of suction cups 2 and the groove 211 are R and r respectively, wherein r and R satisfies an equation of: r:R=0.6~0.9. In one embodiment, the diameters of the plurality of suction cups 2 and the groove 211 are 105.25 mm and 95.5 mm respectively. The smooth surface comprises a degassing hole 212 located in the center of the groove 211. The degassing hole 212 is connecting with the elastic bowl 22. The sliding disk 21 further comprises an angle of chamfer located on the peripheral wall of the sliding disk 21. When the sliding disk 21 slides to across a gap or an altitude difference of the wall, the sliding disk 21 can slide directly across the gap or the altitude difference without being stuck. Thus, the autonomous wall cleaner can walk smoothly on the wall.

A material of the elastic bowl 22 can be rubber or polyurethane. The elastic bowl comprises two or three pleats 221 along a direction parallel to the axial direction. When the plurality of suction cups 2 is sucking on the wall with altitude difference, the organ-type pleats 221 can play the role of buffering. Thus, the plurality of suction cups 2 can be fitted for the wall having certain altitude difference. A surface of the sliding disk 21 adjacent to the elastic bowl 22 comprises an extruding 213 dovetail jointing with the elastic bowl 22. When the vacuum generator pumping the air out of the groove 211 by the degassing hole 212, the elastic bowl 22 and the sliding disk 21 can form a more compact airtight structure because of the dovetail jointing between the sliding disk 21 and the elastic bowl 22.

A number of the plurality of suction cups 2 can be chosen according to a different need. Each of the plurality of suction cups 2 can comprise a safety valve located between the vacuum generator and the plurality of suction cups 2. Thus, when the vacuum degree of some of the plurality of suction cups 2 decreases on the wall with a gap or an altitude difference therein, the vacuum degree of the other suction cups 2 would not be affected. In other embodiment, each of the plurality of suction cups 2 has an independent pipeline. Thus, when the vacuum degree of some of the plurality of suction cups 2 decreases, the vacuum degree of the other suction cups 2 would not be affected. The vacuum degree of the other suction cups 2 can be adjusted by the vacuum generator.

Because the movement of the autonomous wall cleaner depends upon the friction between the plurality of wheels 3 and the wall. The tread of the plurality of wheels 3 requires great coefficient of friction. The tread of the plurality of wheels 3 can comprise a plurality of patterns, such as dentate pattern, wavy pattern or combination thereof.

A length of the plurality of suction cups 2 is greater than a length of the plurality of wheels 3. Thus, when the autonomous wall cleaner is located on the wall, the plurality of suction cups 2 make contact with the wall first and then have good contact with the wall. When the plurality of suction cups 2 is attached to the wall, the organ-type pleats 221 of the elastic bowl would be compressed, thus, the plurality of wheels 3 can contact with the wall completely. Therefore, the friction between the plurality of wheels 3 and the walls can be formed, so as to drive the autonomous wall cleaner walking on the walls.

Figure 4:
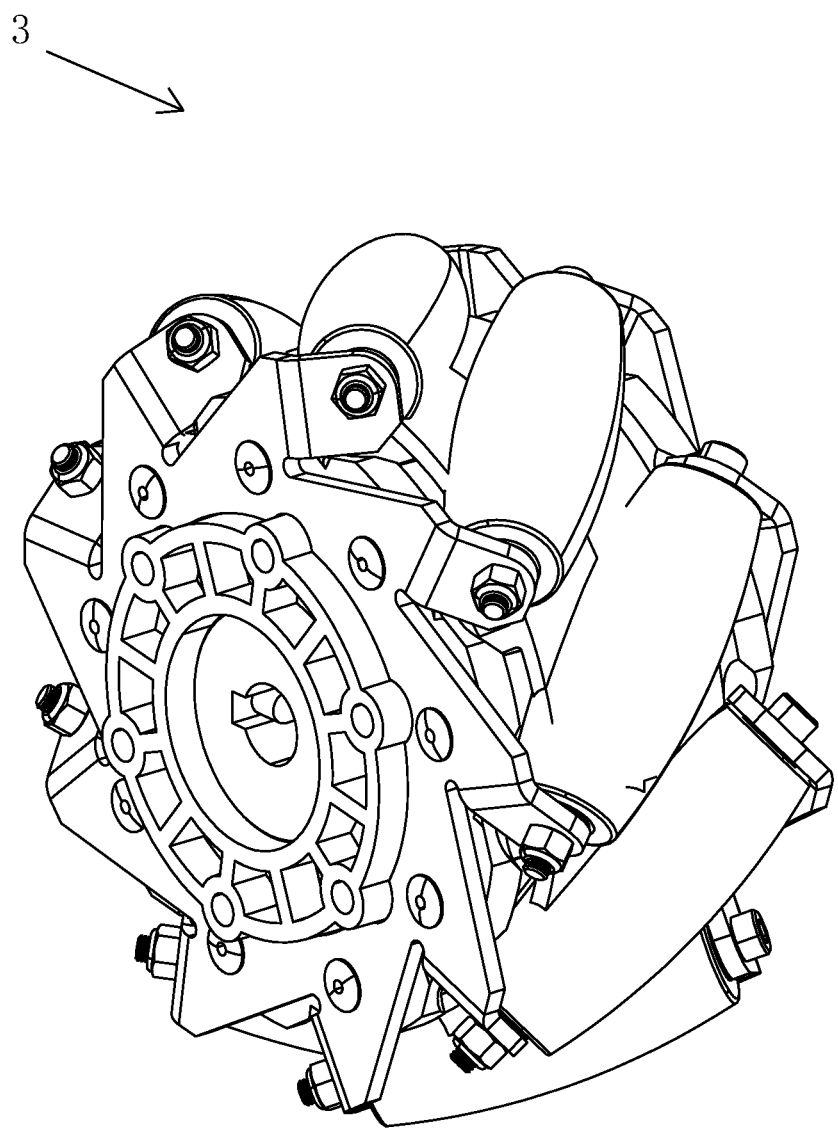
FIG. 4 is a schematic view of one embodiment of a wheel of the autonomous wall cleaner of FIG. 1.

Referring to FIG. 4, the plurality of wheels can be Mecanum wheels. The Mecanum wheels have a compact structure and can rotate freely. Thus, the autonomous wall cleaner can achieve full range of movement, such as forward movement, lateral movement, oblique movement, and rotating, etc. Therefore, the autonomous wall cleaner can clean the special location of the wall.

The autonomous wall cleaner can be adapted to a variety of smooth surfaces, such as glass, ceramic tile, or metal. The working process of autonomous wall cleaner is: when the plurality of suction cups 2 are in contact with the wall, the vacuum generator creates a vacuum in the the plurality of suction cups 2 to make the plurality of suction cups 2 tightly attached to the wall. At this time, the plurality of first actuators 4 drives the plurality of wheels 3 walking roll around to drive the autonomous wall cleaner walking on wall. During this process, the plurality of suction cups 2 still maintain a vacuum with the wall, while sliding along the wall.

Figure 5:
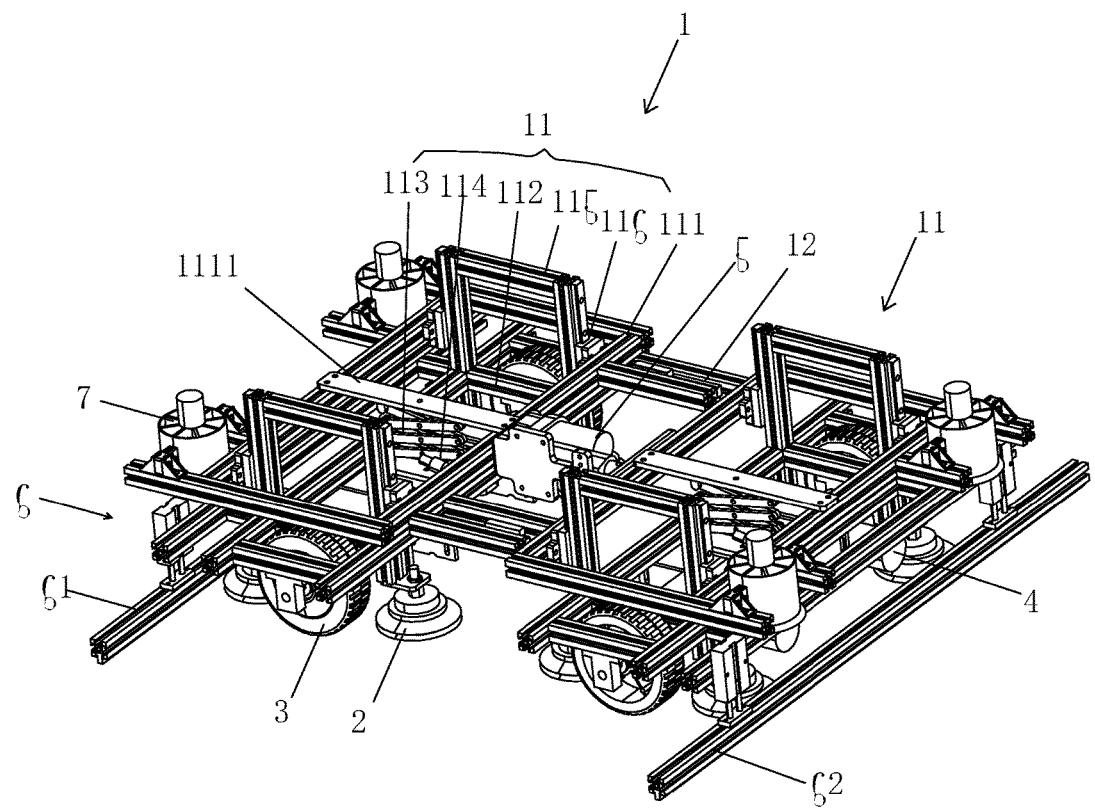
FIG. 5 is a schematic view of another embodiment of the autonomous wall cleaner.
Figure 6:
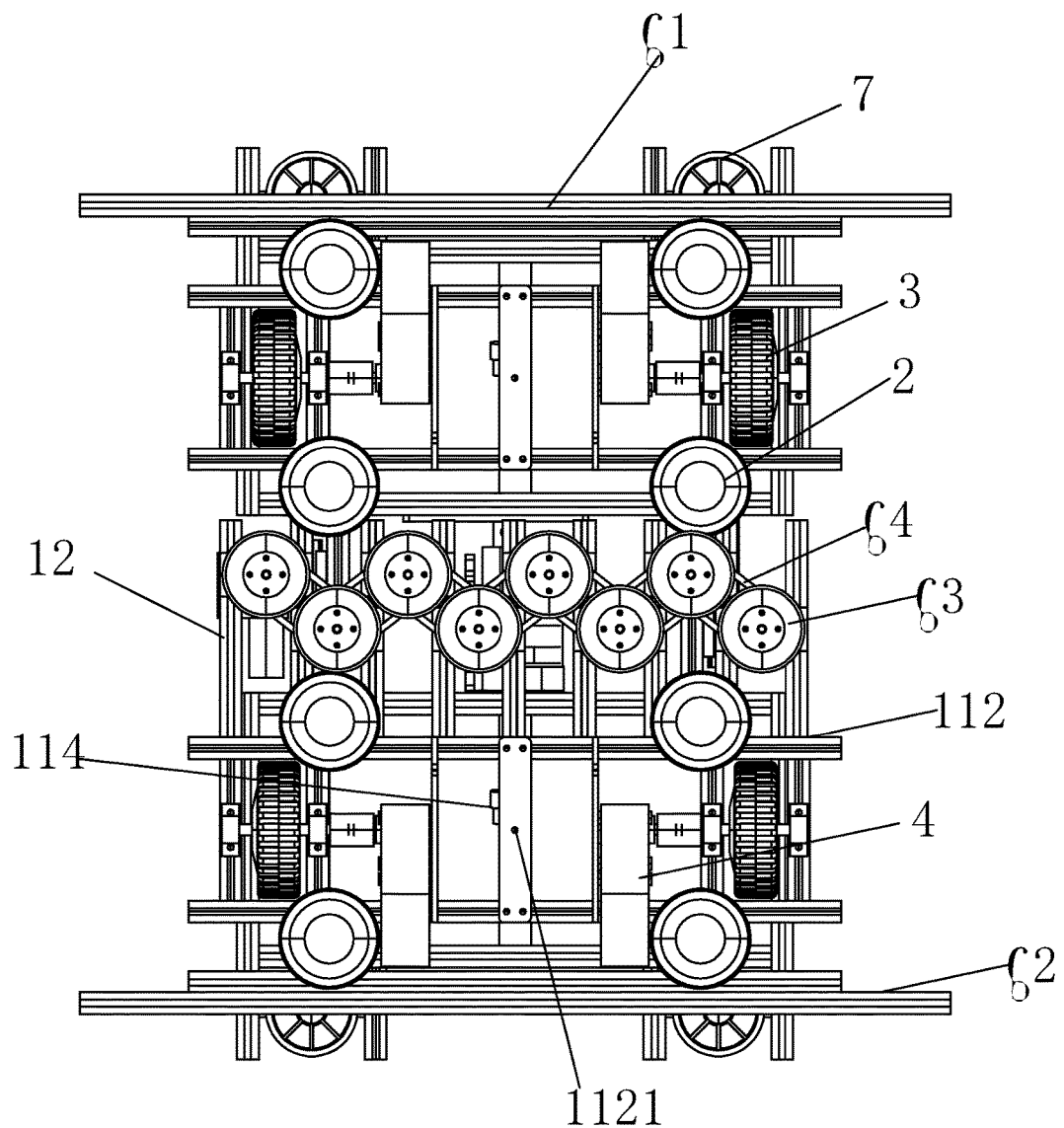
FIG. 6 is a top view of another embodiment of the autonomous wall cleaner of FIG. 5.
Figure 7:
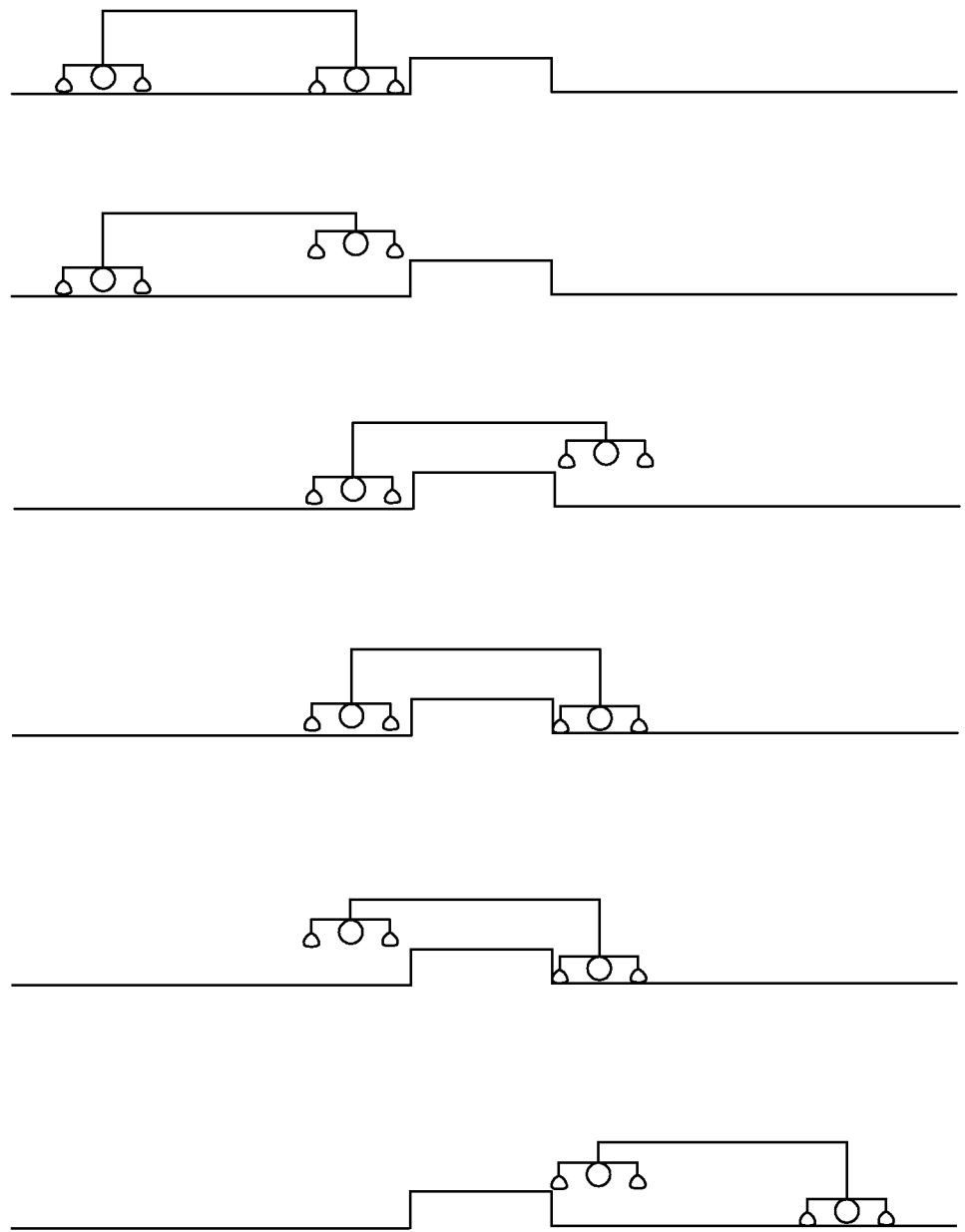
FIG. 7 is a working principle diagram of the autonomous wall cleaner of FIG. 5 when climbing over obstacles.
Figure 8:
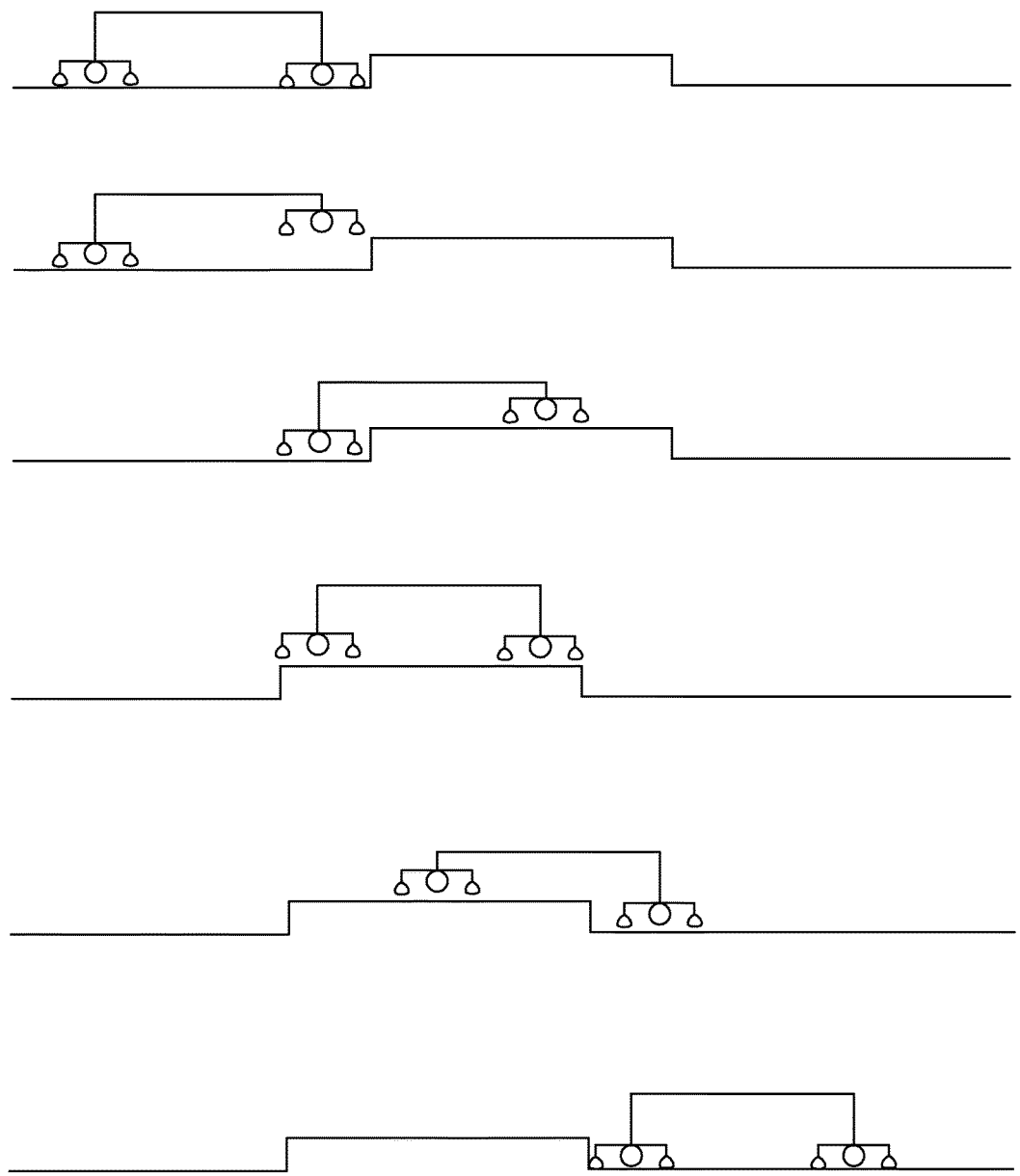
FIG. 8 is a working principle diagram of the autonomous wall cleaner of FIG. 5 when stepping on obstacles.

Referring to FIGS. 5-6, an autonomous wall cleaner of another embodiment is provided. The autonomous wall cleaner comprises a vacuum generator (not shown in the FIG.), a plurality of suction cups 2, a plurality of wheels 3, a plurality of first actuators 4, a second actuator 5, a cleaning element 6 and a controller (not shown in the FIG.) located on a frame 1.

The frame 1 comprises a first sub-frame 11, a second sub-frame 11 and a first guide rail 12. Each of the sub-frame 11 comprises a fixed frame 111, a driving frame 112, a lifting structure 113 and a third actuator 114. The second actuator 5 and the first guide rail 12 are located between the fixed frame 111 of the first sub-frame 11 and the fixed frame 111 of the second sub-frame 11. The lifting structure 113 is fixed between the fixed frame 111 and the driving frame 112. The fixed frame 111 comprises a first crossbeam 1111; the driving frame 112 comprises a second crossbeam 1121. The lifting structure 113 is fixed between the first crossbeam 1111 and the second crossbeam 1121. The third actuator 114 is capable of driving the lifting structure 113. The plurality of suction cups 2, the plurality of wheels 3 and the first actuators 4 are located on the driving frame 112.

Each of the sub-frame 11 further comprises a passive frame 115 and a second guide rail 116. The passive frame 115 is located on the driving frame 112. The second guide rail 116 comprises a second slide block (not labeled in the FIG.) and a second slide chute (not labeled in the FIG.). The second slide chute is located on the fixed frame 111, and the second slide block is located on the passive frame 115.

The first guide rail 12 comprises a first slide block (not labeled in the FIG.) and a first slide chute (not labeled in the FIG.). The first slide block is located on the first frame 11, and the first slide chute is located on the second frame 11.

The second actuator 5 comprises a cylinder, an electric push rod, and an electric telescopic arm. A pushing distance of the second actuator 5 ranges from 0 centimeters up to, and including, 50 centimeters. A pushing distance of the lifting structure 113 ranges from 0 centimeters up to, and including, 50 centimeters.16. The lifting structure 113 can be scissor lifting structures.

Figure 9:
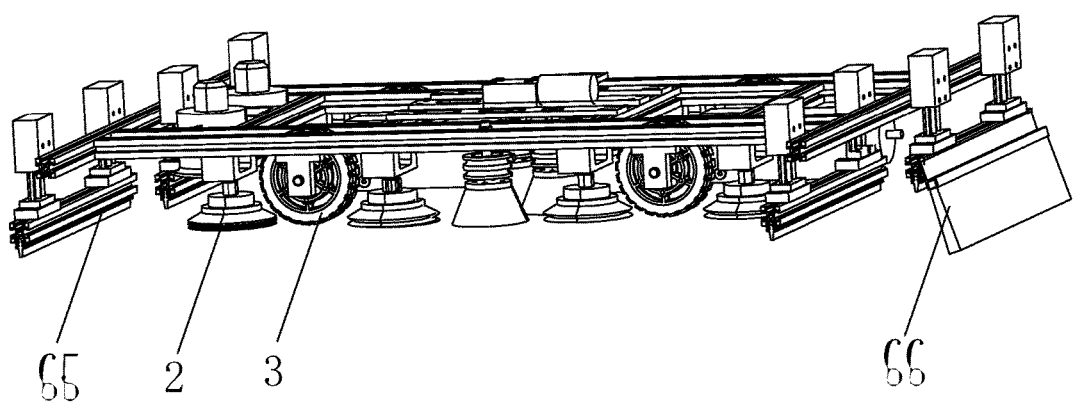
FIG. 9 is a schematic view of another embodiment of the autonomous wall cleaner.

The cleaning element 6 comprises a high-pressure water jet (not shown in FIGS.), a first rubber scraper 61, a second rubber scraper 62 and a disc brush 63. The first rubber scraper 61 is located on the front of the frame 1, the second rubber scraper 62 is located on the back of the frame 1. The disc brush 63 is located at the bottom of the frame 1. In one embodiment, the cleaning element 6 comprises a plurality of disc brushes 63 arranged in a staggered fashion on the bottom of the frame 1. The adjacent two-disc brushes 63 are connected by a belt 64. Referring to FIG. 9, The cleaning element 6 can further comprise a side brush 65 located on both side of the frame 1 and a row brush 66 located on the first rubber scraper 62.

The high-pressure water jet can have detergent therein, and the pressure of the high-pressure water jet can be greater than 10 kgf/cm$^2$. The high-pressure water jet can comprise a jet orifice with a diameter of about 1 millimeter. The jet orifice can inject the detergent as high-speed fine water columns. The side brush exceeds 5-8 centimeters out-of-the entire autonomous wall cleaner. The side brush is capable of cleaning the border and the corner of the wall where the autonomous wall cleaner cannot approach. The first rubber scraper 61 and the second rubber scraper 62 are capable of scraping sewage on the glass. The row brush is capable of cleaning the gap on the wall. A material of disc brush 63 can be nylon yarn having certain hardness in order to clean the glue or concrete. The hardness of the disc brush 63 can be chosen according to different needs. The disc brush 63 can also be a grinding head. The grinding head can be used to polish the glass or to scrub the stubborn stains.

The autonomous wall cleaner can further comprise four fans 7 located on four corners of the frame 1. The four fans 7 can be used to help push the autonomous wall cleaner on the concave wall. When the autonomous wall cleaner is ascending to the concave wall by the safety rope, the four fans 7 are started-up. A propulsive force would be formed by the four fans 7 to push the autonomous wall cleaner approach the concave wall. The propulsive force can be precisely controlled by the controller to make the autonomous wall cleaner approach the concave wall. Thus, the autonomous wall cleaner can approach the concave wall and then attach on the concave wall.

The controller can further comprise a sensor capable of obtaining a position and a size of obstacles in the front of the autonomous wall cleaner. The controller is capable of driving the autonomous wall cleaner according to the position and the size of obstacles. When the size of obstacles is smaller than the maximum pushing distance of the second actuator 5, the controller will execute stride instruction. Referring to FIG. 6, the lifting structure 113 in the front of the autonomous wall cleaner can elevate and then stride across the obstacles. After that, the lifting structure 113 in the back of the autonomous wall cleaner can elevate and then stride across the obstacles. When the size of obstacles is greater than the maximum pushing distance of the second actuator 5, the controller will execute stepping instruction. Referring to FIG. 6, the lifting structure 113 in the front of the autonomous wall cleaner can elevate and then step on the obstacles; after that, the lifting structure 113 in the back of the autonomous wall cleaner can elevate and then step on the obstacles.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. An autonomous wall cleaner comprising:
a vacuum generator, a plurality of suction cups, a plurality of wheels, a plurality of first actuators, a cleaning element and a controller located on a frame;
wherein, the plurality of wheels are symmetrically arranged on both sides of the frame, the plurality of first actuators is capable of driving the plurality of wheels; each of the plurality of suction cups is coupled with the vacuum generator and comprises a sliding disk and an elastic bowl sealed by the sliding disk; the elastic bowl is located on the frame; and when the plurality of wheels are rotate against a surface, the plurality of suction cups create a vacuum with the surface and while the sliding disk are sliding along the surface;
wherein a surface of the sliding disk comprises an extruding dovetail jointing with the elastic bowl.

2. The autonomous wall cleaner as claimed in claim 1, wherein, a surface of the sliding disk adjacent to the wall comprises a smooth surface, the smooth surface comprises a groove and a degassing hole connecting with the elastic bowl, the sliding disk comprises a material that is selected from a group comprising of PTFE, POM, metal, and ceramic.

3. The autonomous wall cleaner as claimed in claim 2, wherein the sliding disk comprises an angle of chamfer located on peripheral wall of the sliding disk.

4. The autonomous wall cleaner as claimed in claim 1, wherein the elastic bowl comprises two or three pleats.

5. The autonomous wall cleaner as claimed in claim 1, wherein each of the plurality of suction cups comprises a safety valve.

6. The autonomous wall cleaner as claimed in claim 1, wherein the plurality of wheels comprises Mecanum wheels.

7. The autonomous wall cleaner as claimed in claim 1, further comprising four fans located on the frame.

8. The autonomous wall cleaner as claimed in claim 1, further comprising a second actuator, and the frame comprises a first sub-frame, a second sub-frame, and a first guide rail; each of the first sub-frame and the second sub-frame comprises a fixed frame, a driving frame, a lifting structure and a third actuator; the second actuator and the first guide rail are located between the fixed frame of the first sub-frame and the fixed frame of the second sub-frame; the lifting structure is fixed between the fixed frame and the driving frame; the third actuator is capable of driving the lifting structure; and the plurality of suction cups, the plurality of wheels and the plurality of first actuators are located on the driving frame.

9. The autonomous wall cleaner as claimed in claim 8, wherein each of first sub-frame and the second sub-frame further comprises a passive frame and a second guide rail, and the passive frame is located on the driving frame; the second guide rail comprises a second slide block and a second slide chute; the second slide chute is located on the fixed frame; and the second slide block is located on the passive frame.

10. The autonomous wall cleaner as claimed in claim 9, wherein, the first guide rail comprises a first slide block and a first slide chute; and the first slide block is located on the first sub-frame and the first slide chute is located on the second sub-frame.

11. The autonomous wall cleaner according to claim 8, wherein the second actuator comprises a cylinder, an electric push rod, and an electric telescopic arm; and a pushing distance of the second actuator ranges from 0 centimeters up to, and including, 50 centimeters.

12. The autonomous wall cleaner according to claim 8, wherein a pushing distance of the lifting structure ranges from 0 centimeters up to, and including, 50 centimeters.

13. The autonomous wall cleaner according to claim 8, wherein the lifting structure comprises a scissor lifting structure.

14. The autonomous wall cleaner according to claim 1, wherein the controller further comprises a sensor capable of obtaining a position and a size of obstacles in front of the autonomous wall cleaner.

15. The autonomous wall cleaner according to claim 14, wherein the controller is capable of driving the autonomous wall cleaner according to the position and the size of obstacles.

16. The autonomous wall cleaner according to claim 1, wherein the cleaning element comprises a high-pressure water jet, a first rubber scraper, a second rubber scraper and a disc brush; the first rubber scraper is located on the front of the frame, the second rubber scraper is located on the back of the frame, and the disc brush is located on the bottom of the frame.

17. The autonomous wall cleaner according to claim 16, wherein, the cleaning element further comprises a side brush located on both sides of the frame, and a row brush located on the first rubber scraper.

18. The autonomous wall cleaner according to claim 16, wherein the disc brush are arranged in a staggered fashion on the bottom of the frame.

19. The autonomous wall cleaner according to claim 16, wherein, further comprising a plurality of disc brushes, and adjacent two disc brushes are connected by a belt.

* * * * *